United States Patent
Boland (10) Patent No.: US 9,821,772 B2
(45) Date of Patent: Nov. 21, 2017

(54) WINDSCREEN WIPER DEVICE (75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 1379 days.

(21) Appl. No.: 12/935,649

(22) PCT Filed: Mar. 30, 2009

(86) PCT No.: PCT/EP2009/053759
§ 371 (c)(1),
(2), (4) Date: Dec. 27, 2010

(87) PCT Pub. No.: WO2009/121849
PCT Pub. Date: Oct. 8, 2009

(65) Prior Publication Data
US 2011/0131749 A1   Jun. 9, 2011

(30) Foreign Application Priority Data

Mar. 31, 2008  (EP) .................................... 08103243

(51) Int. Cl.
*B60S 1/38*   (2006.01)
(52) U.S. Cl.
CPC ............. *B60S 1/381* (2013.01); *B60S 1/3879* (2013.01); *B60S 2001/3836* (2013.01)
(58) Field of Classification Search
CPC ...... B60S 1/381; B60S 1/3881; B60S 1/3879; B60S 1/3836
USPC ............................. 15/250.3, 250.201, 250.43
See application file for complete search history.

(56) References Cited

U.S. PATENT DOCUMENTS

| | | | |
|---|---|---|---|
| 6,944,905 B2 * | 9/2005 | De Block et al. | 15/250.201 |
| 7,210,189 B2 * | 5/2007 | Nacamuli | 15/250.201 |
| 2003/0145412 A1 * | 8/2003 | Weiler et al. | 15/250.201 |
| 2003/0159229 A1 * | 8/2003 | Weiler et al. | 15/250.201 |
| 2004/0098821 A1 | 5/2004 | Kraemer et al. | |
| 2007/0022556 A1 | 2/2007 | Walworth et al. | |
| 2007/0061993 A1 | 3/2007 | Lee | |
| 2008/0201894 A1 | 8/2008 | Ko | |

(Continued)

FOREIGN PATENT DOCUMENTS

| | | |
|---|---|---|
| DE | 102004012867 A1 | 10/2005 |
| EP | 0506542 A | 9/1992 |
| EP | 0549395 A | 6/1993 |

(Continued)

*Primary Examiner* — Monica Carter
*Assistant Examiner* — Stephanie Berry
(74) *Attorney, Agent, or Firm* — Robert L. Stearns; Dickinson Wright, PLLC (57) ABSTRACT

A windscreen wiper device comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for an oscillating wiper arm, as well as a spoiler, characterized in that the spoiler is movable from a first position, wherein the spoiler has an symmetric profile, seen in cross-section of the wiper blade, in the absence of a wind load thereon, into a second position, wherein the spoiler has a asymmetric profile, seen in cross-section of the wiper blade, in the presence of a wind load thereon.

11 Claims, 6 Drawing Sheets

(56) References Cited

U.S. PATENT DOCUMENTS

2009/0106928 A1* 4/2009 Lee .................. B60S 1/3808
15/250.361

FOREIGN PATENT DOCUMENTS

| WO | 02087935 A1 | 11/2002 |
| WO | 2006088274 A1 | 8/2006 |
| WO | 2007014389 A2 | 2/2007 |

* cited by examiner

FIG. 8 airflow

WINDSCREEN WIPER DEVICE

BACKGROUND OF THE INVENTION

1. Technical Field

The invention relates to a windscreen wiper device comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, which windscreen wiper device comprises a connecting device for an oscillating wiper arm, as well as a spoiler. Such a spoiler is also called an "air deflector".

2. Related Art

Such a windscreen wiper device is generally known. The prior art windscreen wiper device is in particular designed as a "yokeless" wiper device, wherein use is no longer made of several yokes pivotally connected to each other, but wherein the wiper blade is biassed by the carrier element, as a result of which it exhibits a specific curvature. The spoiler and the wiper blade of the known windscreen wiper device are made in one piece.

Windscreen wiper devices actually used on cars fined with windscreens exhibiting some degree of curvature are sometimes subjected to a lifting effect at high speeds, which prevents the windscreen from being wiped correctly. This lifting effect is due to the following aerodynamic phenomenon. Streams of air along the car tend to escape vertically upwards along the axis of the car. Near the sides of the curved windscreen, however, the streams of air tend to pass horizontally along the sides. These streams of air create, mainly in the zones in which the windscreen wiper device meets them perpendicularly, a reduced pressure above the windscreen wiper device and an increased pressure between the windscreen and the windscreen wiper device. The resulting pressure, in spite of the mechanical pressure applied by the arm of the windscreen wiper device, causes the latter to lift away towards the front of the windscreen, thereby deteriorating the wiping pattern at higher driving speeds. A spoiler is often used to suppress the lifting effect.

A disadvantage of the known windscreen wiper device is that a specific wiper blade equipped with an asymmetric spoiler has to be designed and manufactured for an oscillating arm at the drivers side of a vehicle and for an oscillating arm at the passengers side of the vehicle. Obviously this requires the use of complex machinery, tools, with all the expenses involved, A further drawback is that mutually differing wiper blades with asymmetric spoilers for each type of oscillating arm (that is at the drives side or at the passenger side) require much space for storage both in a warehouse and in a shop. Still a further disadvantage is that a wiper blade equipped with an asymmetric spoiler meant to be mounted on an oscillating arm at the drivers side of a vehicle is often actually mounted on an oscillating arm at the passengers side of the vehicle, while such wiper blade equipped with an asymmetric spoiler meant to be mounted on an oscillating arm at the passenger side of a vehicle is often actually mounted on an oscillating arm at the drivers side of the vehicle. Such a reversed mounting of these wiper blades seriously affect the wiping qualities thereof particularly at high speeds, with all negative consequences involved.

SUMMARY OF THE INVENTION AND ADVANTAGES

It is an object of the invention to obviate all these disadvantages, in the sense that at min costs one type of wiper blade comprising a spoiler is proposed which can be mounted on both types of oscillating arms of a car (that is at the drives side and at the passenger side) without the use of complex machinery and additional tools being required.

It is noted that the present invention is not restricted to windscreen wiper devices for cars, hut that it also relates to windscreen wiper devices for rail coaches and all other (fast) vehicles.

In order to accomplish that objective, a windscreen wiper device of the kind referred to in the introduction according to the invention is characterized in that the spoiler is movable from a first position, wherein the spoiler has a symmetric profile, seen in cross-section of the wiper blade, in the absence of a wind load thereon, into a second position, wherein the spoiler has a asymmetric profile, seen in cross-section of the wiper blade, in the presence of a wind load thereon. Preferably, the spoiler is movable, particularly hingeable between the first and second positions. In other words, due to the symmetric form of the spoiler in case air streams of wind do not exercise a load onto the wiper blade, the wiper blade can be mounted on the oscillating arm at both the drivers side and the passengers side of the car. Further, by avoiding any reverse mounting of these wiper blades the spoilers or air-deflectors provided thereon will always be in the right position. Due to the asymmetric shape of the spoiler in case a load is exercised thereon by air streams of wind, the wiping qualities will be guaranteed at all times. The asymmetric shape of the spoiler is then particularly provided with an incident air flow surface which extends in its longitudinal direction and essentially parallel to the windscreen to be wiped and faces the relative wind and which, seen transversely to its longitudinal extent, encloses an acute angle with the windscreen to be wiped.

In one preferred embodiment of a windscreen wiper device according to the invention, the spoiler is hingeable by deformation between the first and second positions. Particularly, the spoiler is made of a material deformable in the presence/absence of a wind load thereon. More in particular, the spoiler is at least substantially made of a thermoplastic elastomer, elastic elastomer or (soft) PVC.

In another preferred embodiment of a windscreen wiper device in accordance with the invention, the spoiler is hingeable between the first and second positions by means of a tilting web interconnecting the spoiler and a holding part holding the spoiler onto the wiper blade. In another preferred embodiment the spoiler is hingeable between the first and second positions by means of a neck extending from the spoiler and an enlarged head extending from the neck, wherein the enlarged head is tiltably mounted into a hollow chamber defined in a holding part holding the spoiler onto the wiper blade.

In another preferred embodiment of a windscreen wiper device according to the invention, the wiper blade includes opposing longitudinal grooves on its longitudinal sides, in which grooves spaced-apart longitudinal strips of the carrier element are disposed, wherein neighboring ends of the longitudinal strips are interconnected by a respective connecting piece, and wherein the spoiler comprises clamping means, which engage round longitudinal sides of the longitudinal strips that face away from each other. Preferably, the spoiler and the clamping means are made in one piece.

In another preferred embodiment of a windscreen wiper device in accordance with the invention, the wiper blade includes opposing longitudinal grooves on its longitudinal sides, in which grooves spaced-apart longitudinal strips of the carrier element are disposed, wherein neighboring ends of the longitudinal strips are interconnected by a respective connecting piece, wherein the spoiler comprises two sub-spoilers each on one side of the connecting device, wherein each subspoiler extends from the connecting device to a respective connecting piece, and wherein each subspoiler is connected to the wiper blade or to the longitudinal strips of the carrier element.

THE DRAWINGS

The invention will now be explained in more detail with reference to the drawings, wherein.

DETAILED DESCRIPTION

Figures 1, 2, 3, 4:
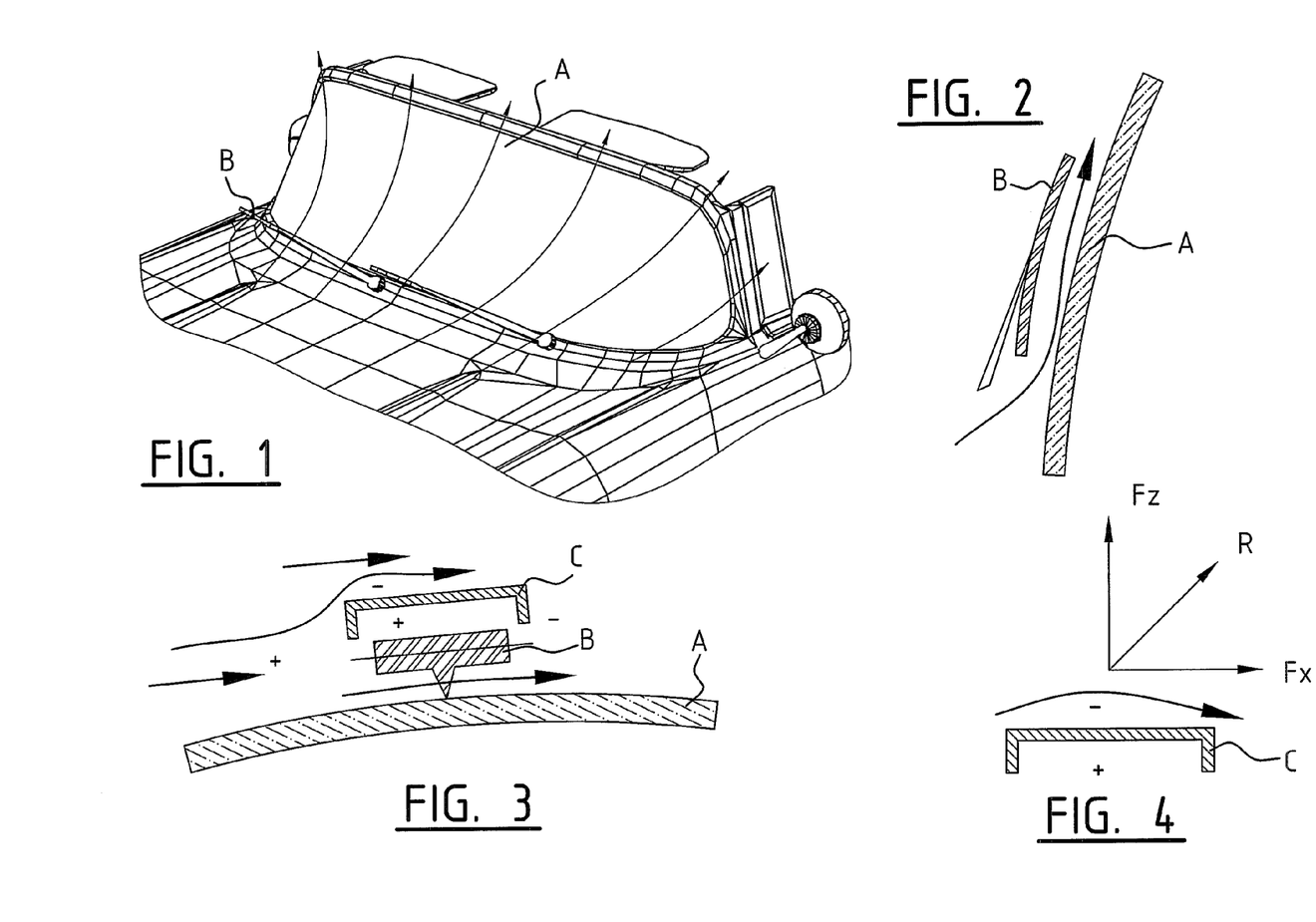
FIG. 1 shows diagrammatically the flow of streams of air along the windscreen of a car.
FIG. 2 is a diagram of a standard windscreen wiper device in a position parallel to the streams of air.
FIG. 3 is a cross-section of the same windscreen wiper device, but in a position at right angles to the streams of air.
FIG. 4 illustrates the forces due to the tangential streams of air acting on the standard windscreen wiper device.

FIG. 1 shows a perspective view of the front portion of a car provided with a curved windscreen A, together with the direction of flow of the streams of air, the latter passing the vehicle upwards and along the sides. In a zone in which a windscreen wiper device of the usual standard form is positioned parallel to the streams of air, as shown in FIG. 2, nothing unusual occurs; on the other hand, in a zone as shown in FIG. 3, in which the streams of air flow practically at right angles to the direction of the windscreen wiper device, this air cannot flow along the glass because of the wiper blade, and thus creates an increase in pressure (indicated by the + sign). Such an increased pressure also exists in the region of the hollow profile comprised between the flanges of the frame C directed towards the windscreen. These flanges create further obstacles to the flow of air and assist in maintaining the increased pressure. In addition, the streams of air which pass round the windscreen wiper device towards the upstream side tend to move away from the surface and create a reduced pressure zone (indicated by the − sign), as is well known. These two forces Fx and Fz (which can be compared with the drag and the lift acting on a wing section) have a resultant R which tends to lift the windscreen wiper device against the mechanical pressure applied by the arm (see FIG. 4).

Figure 5:
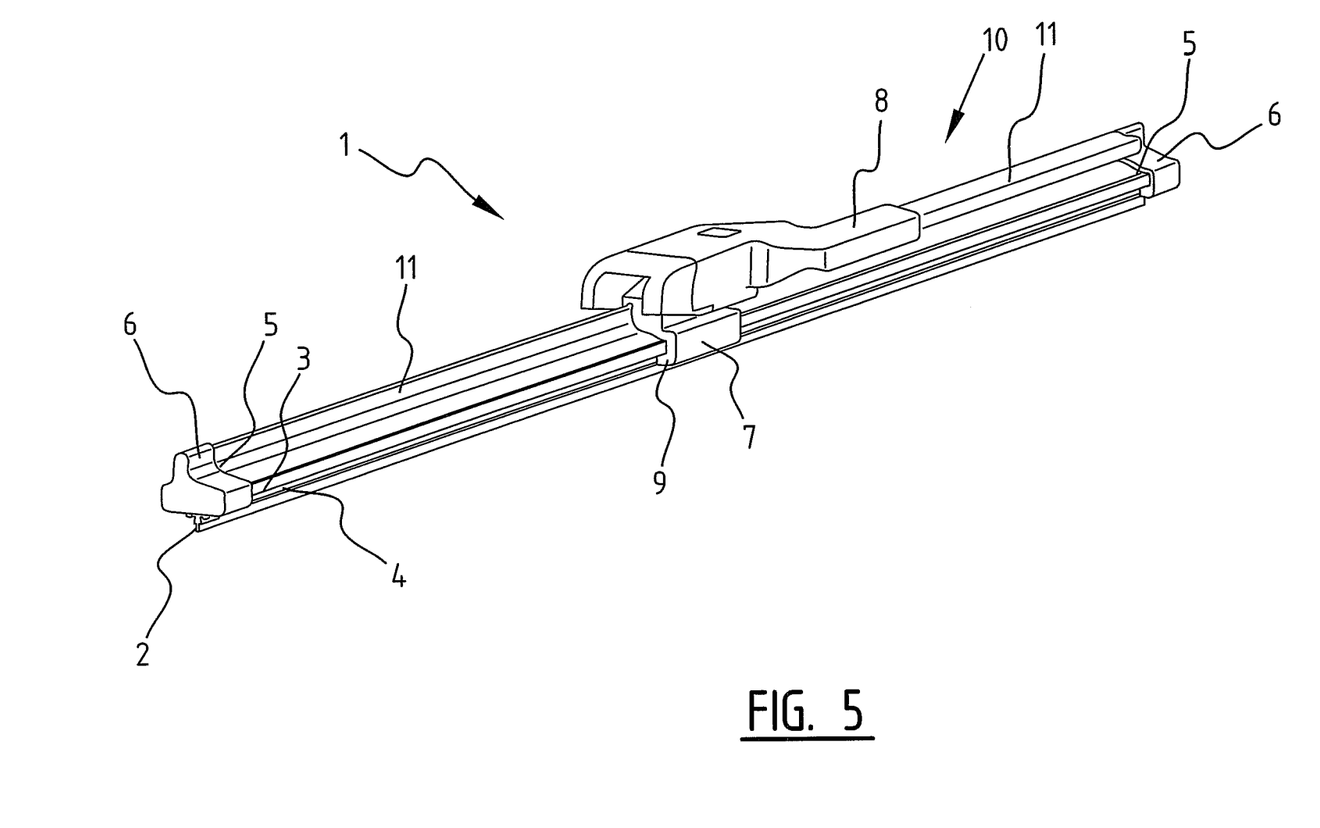
FIG. 5 is a total perspective, schematic view of a windscreen wiper device according to the invention.

FIG. 5 shows a preferred variant of a windscreen wiper device 1 according to the invention. The windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biased in a curved position (the curvature in operative position being that of a windscreen to be wiped). Neighboring ends 5 of strips 4 are interconnected on either side of the windscreen wiper device 1 by means of connecting pieces 6 functioning as clamping members. In this embodiment, the connecting pieces 6 are separate constructional elements, which may be form-locked as well as force-locked to the ends 5 of strips 4. In another preferred variant, the connecting pieces 6 are in one piece with the strips 4 made of spring band steel. In the latter case the connecting pieces form transverse bridges for the strips 4, as it were. The windscreen wiper device 1 is furthermore built up of a connecting device 7 of plastic material for an oscillating wiper arm 8. Connecting device 7 comprises clamping members 9 that are integral therewith, which engage round longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end. The preferred embodiment of FIG. 5 according to the invention comprises a spoiler 10 including two separate sub-spoilers 11. Each sub-spoiler 11 is detachably connected in its entirety to the wiper blade 2 on opposite sides of the connecting device 7.

Figure 6A:
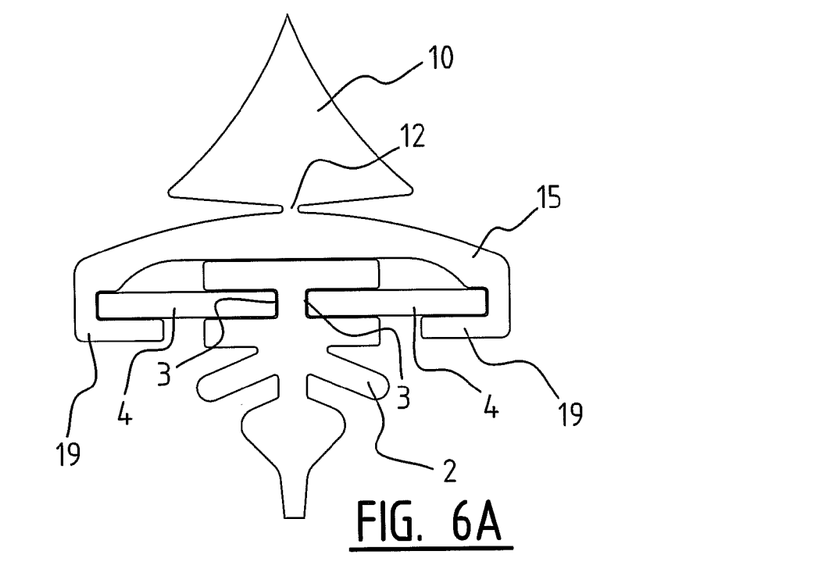
FIGS. 6 through 10 are cross-sectional views of different embodiments of the windscreen wiper device of FIG. 5.
Figure 6B:
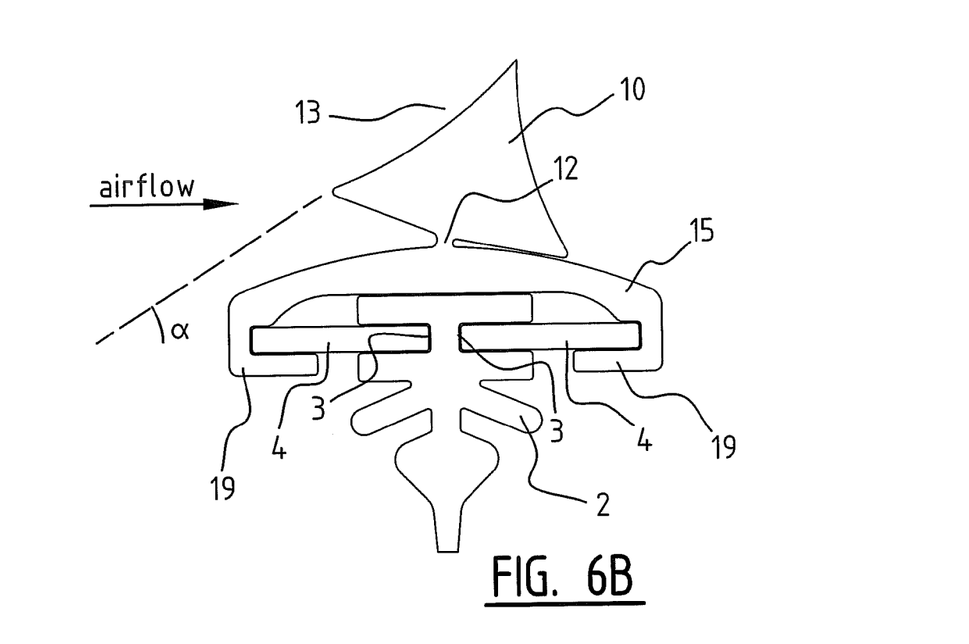

In FIG. 6 a cross-sectional view of the windscreen wiper device of FIG. 5 is shown, wherein corresponding parts have been designated with the same reference numerals. In the event that the spoiler (10) is not charged by the wind (FIG. 6a), the spoiler (10) has a symmetric shape, seen in cross-section of the wiper blade (2). In that case such wiper blades (2) can be mounted on oscillating arms (8) at both the drivers side and the passengers side of the car, while any reverse mounting of these wiper blades (2) is by definition avoided. Thus the spoilers (10) provided thereon are always in the right position. However, in the event that the spoiler (10) is subsequently charged by the wind (FIG. 6b), the spoiler (10) is hinged about an hinging or pivot point (12) from the position of FIG. 6a into the position of FIG. 6b. In the latter position the spoiler (10) has an asymmetric shape, seen in cross-section of the wiper blade (2). The asymmetric shape of the spoiler is then particularly provided with an incident air flow surface (13) enclosing an acute angle (a) with the windscreen to be wiped. As shown in FIG. 6 the hinging point (12) interconnects the spoiler (10) and a holding part (15) holding the spoiler (10) onto the wiper blade (2). The spoiler (10) and the holding part (15) are in one piece of rubber.

Figure 7A:
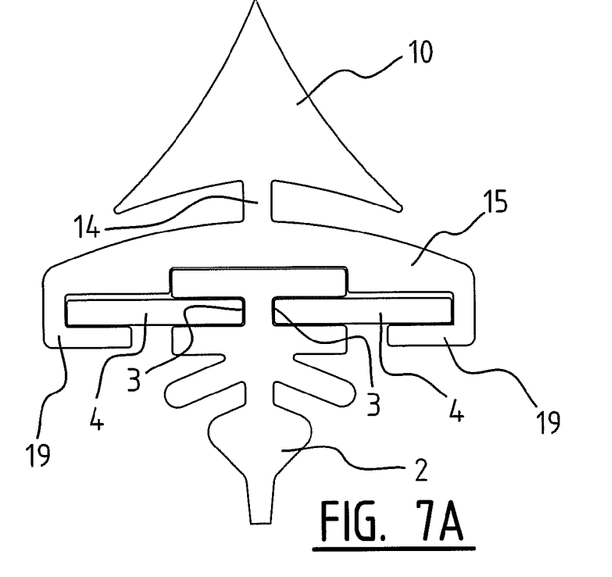
Figure 7B:
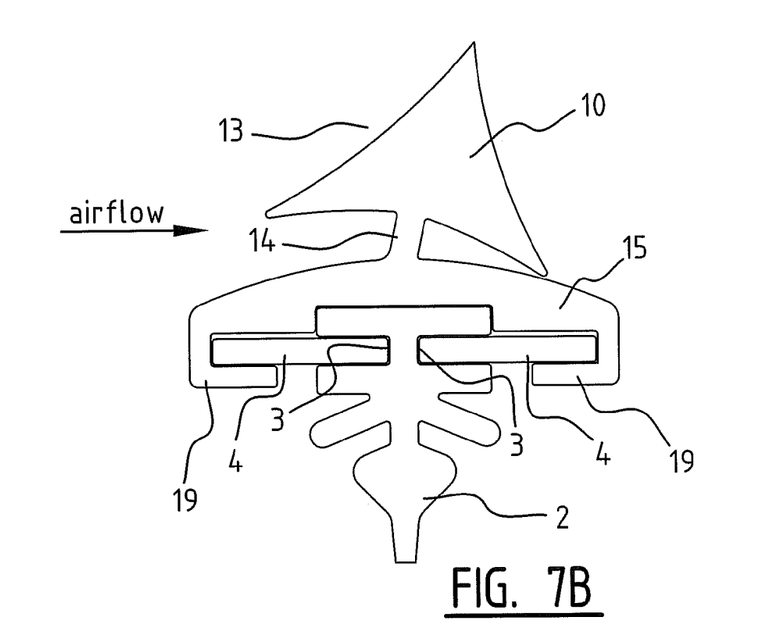

FIGS. 7a and 7b correspond to FIGS. 6a and 6b, respectively, on the understanding that the spoiler (10) is now hingeable between the positions shown in FIGS. 7a and 7b by means of a tilting web (14) interconnecting the spoiler (10) and a holding part (15) holding the spoiler (10) onto the wiper blade (2). Again, the spoiler (10), the tilting web (14) and the holding part (15) are in one piece of rubber.

Figure 8:
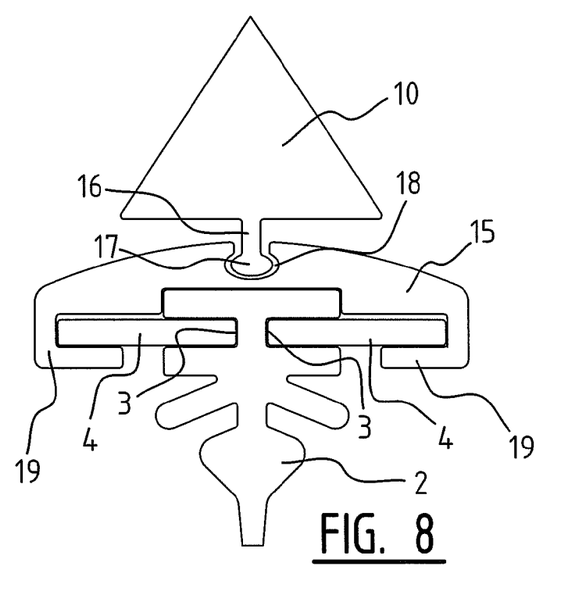

FIG. 8 corresponds to FIGS. 6a and 7a, with the difference that the spoiler (10) is hingeable by means of a neck (16) extending from the spoiler (10) and an enlarged head (17) extending from the neck (16), wherein the enlarged head (17) is tiltably or pivotally mounted into a hollow chamber (18) defined in the holding part (15) holding the spoiler (10) onto the wiper blade (2). Thus the spoiler (10) is then a separate constructional part.

Figure 9:
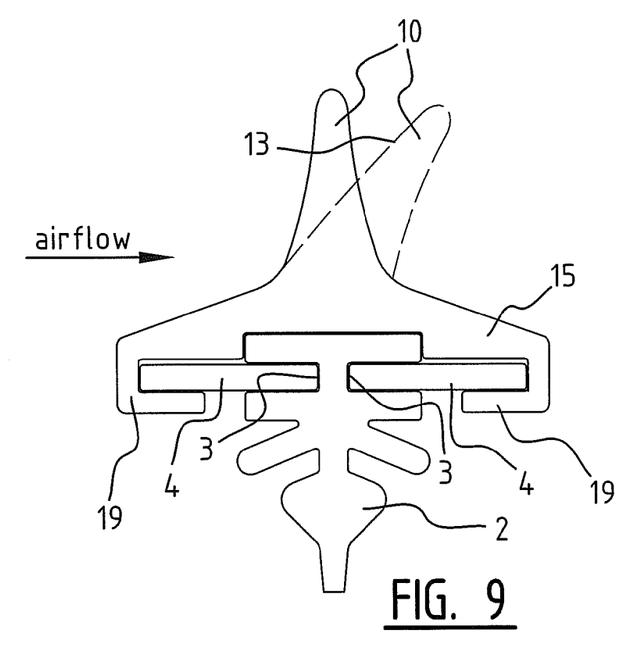

FIG. 9 corresponds to FIG. 8, wherein the spoiler (10) is now hingeable by deformation. The dashed lines show the spoiler (10) hinged under the influence of the wind into a position, wherein it has an asymmetric shape similar to the ones shown in FIGS. 6a, 7a and 6b, 7b, respectively, seen in cross-section of the wiper blade (2). The spoiler (10) is made of a material deformable in the presence/absence of a wind load thereon, i.e. a material such as a thermoplastic rubber.

As shown in FIGS. 6 through 9, the holding part (15) comprises clamping means (19), which engage round longitudinal sides of the longitudinal strips (4) that face away from each other.

Figure 10:
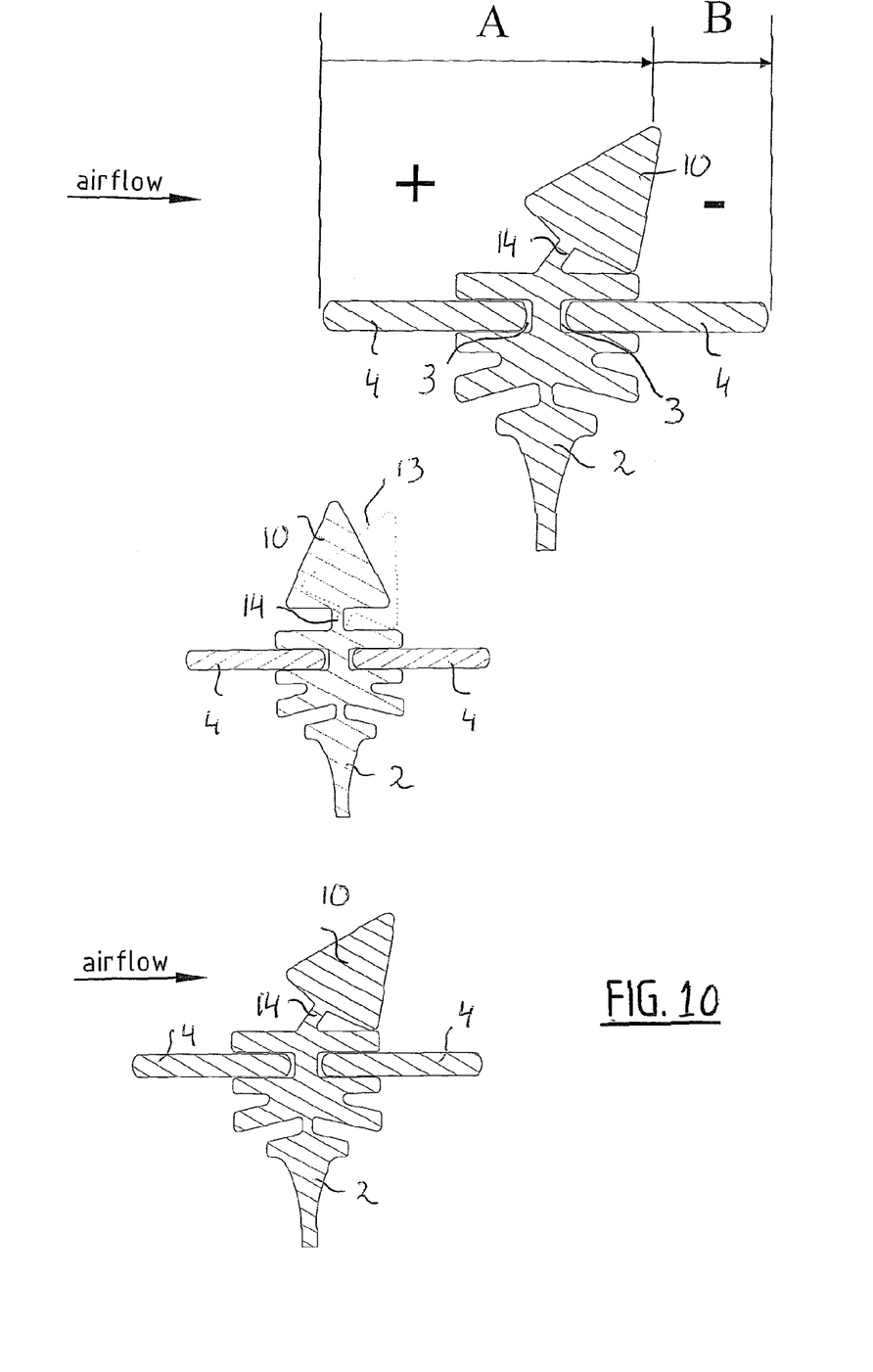

FIG. 10 corresponds to FIG. 7, with the difference that now no holding part (15) is provided for. If there is no wind, the spoiler (10) has a symmetric profile, seen in cross-section of the wiper blade (2) along its middle transverse plane, that is distance A is equal to distance B. Distance A is larger than distance B, if there is wind, so that the vertical pressure due to the overpressure (indicated in FIG. 10 with + is bigger than the lift due to the under-pressure (indicated in FIG. 10 with −). In the latter case the spoiler (10) has an asymmetric profile, seen in cross-section of the wiper blade (2). Please note that the distances A and B are measured from the top of the spoiler (10) to vertical sides of the strips (4) facing away from each other.

The invention is not restricted to the embodiments shown, but also extends to other preferred embodiments falling within the scope of the appended claims.

The invention claimed is:

1. A windscreen wiper device comprising an elastic, elongated carrier element, as well as an elongated wiper blade of a flexible material, which can be placed in abutment with a windscreen to be wiped, which windscreen wiper device comprises a connecting device for attachment to an oscillating wiper arm, as well as a spoiler, wherein said spoiler is movable from a first position in which said spoiler has a symmetric profile seen in cross-section of the wiper blade in the absence of a wind load thereon, into a second position in which said spoiler has a asymmetric profile seen in cross-section of the wiper blade in the presence of a wind load thereon, wherein said spoiler is hingeable between said first and second positions by means of a tilting web located above a longitudinal groove of said wiper blade.

2. A windscreen wiper device according to claim 1, wherein said spoiler is movable between said first and second positions.

3. A windscreen wiper according to claim 1, wherein said spoiler is hingeable between said first and second positions.

4. A windscreen wiper according to claim 3, wherein said spoiler is hingeable by deformation between said first and second positions.

5. A windscreen wiper according to claim 4, wherein said spoiler is at least substantially made of a material deformable/recoverable in the presence/absence of a wind load thereon.

6. A windscreen wiper according to claim 4, wherein said spoiler is at least substantially made of a thermoplastic elastomer, elastic elastomer or soft PVC.

7. A windscreen wiper according to claim 3, wherein said spoiler is hingeable between said first and second positions by means of a tilting web interconnecting said spoiler and a holding part holding said spoiler onto said wiper blade.

8. A windscreen wiper according to claim 3, wherein said spoiler is hingeable between said first and second positions by means of a neck extending from said spoiler and an enlarged head extending from said neck, wherein said enlarged head is tiltably mounted into a hollow chamber defined in a holding part holding said spoiler onto said wiper blade.

9. A windscreen wiper device according to claim 1, wherein said wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, and wherein said spoiler comprises clamping means, which engage around longitudinal sides of said longitudinal strips that face away from each other.

10. A windscreen wiper device according to claim 9, wherein said spoiler and said clamping means are made in one piece.

11. A windscreen wiper according to claim 1 wherein said wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, wherein said spoiler comprises two subspoilers each on one side of the connecting device, wherein each subspoiler extends from the connecting device to a respective connecting piece, and wherein each subspoiler is connected to the wiper blade or to the longitudinal strips of the carrier element.

\* \* \* \* \*